May 13, 1947.    R. STEVENSON ET AL    2,420,627
REMOTE CONTROL APPARATUS
Original Filed Oct. 5, 1942
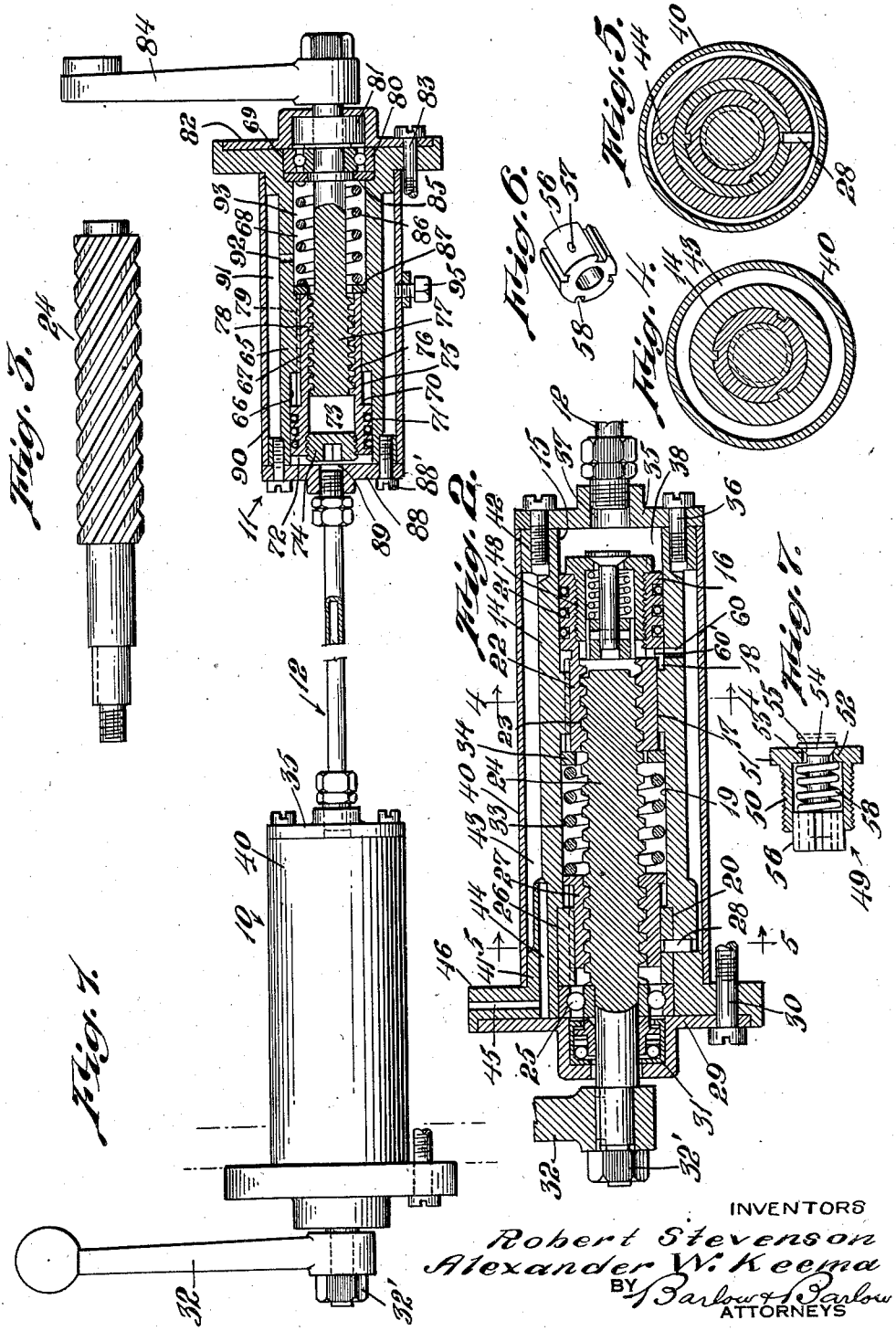
INVENTORS
Robert Stevenson
Alexander W. Keema
BY Barlow & Barlow
ATTORNEYS Patented May 13, 1947

2,420,627

UNITED STATES PATENT OFFICE 2,420,627

REMOTE CONTROL APPARATUS

Robert Stevenson, Barrington, and Alexander W. Keema, Providence, R. I., assignors to Merit Engineering, Inc., a corporation of Rhode Island Original application October 5, 1942, Serial No. 460,794, now Patent No. 2,344,473, dated March 14, 1944. Divided and this application January 14, 1944, Serial No. 518,288

4 Claims. (Cl. 60—54.5)

1

This invention relates to a remote control apparatus of the type in which the transmission of movement from one actuating unit to another actuated unit is by liquid or hydraulic means and is a division of our co-pending application Serial No. 460,794, filed October 5, 1942, which has now issued in Patent No. 2,344,473.

Although the transmission in a remote control apparatus has been heretofore done by hydraulic means in which a piston moves the liquid or is moved by the liquid at the remote location it is quite usual to actuate the piston and have the pistons in turn actuate some mechanical link and lever arrangement for the transmission or conversion of power to or from the actuating piston. Such linkages and leverages become more or less easily worn and they are materially retarded by friction.

One of the objects of this invention is to provide an improved means for actuating the piston in the actuating unit and an improved means actuated by the piston in the actuated unit.

Another object of this invention is to provide a control which will be relatively free from friction.

Another object of this invention is to provide a mechanical operating part acting in a liquid which will act as a lubricant for the movement of these parts one upon the other.

Another object of this invention is to provide the transmission of rotary movement to longitudinal movement through a screw action and vice versa whereby a positive conversion of movement from one direction to the other may be provided.

Another object of this invention is to provide an automatic means for maintaining liquid in a hydraulic transmission from one unit to the other always full to capacity.

Another object of this invention is to provide a means to control the reacting hydraulic pressure which acts upon the threaded member through which movement is applied to the actuating piston.

Another object of the invention is to provide a construction having a theoretically unlimited angular rotation.

With these and other objects in view, the invention consists of certain novel features of construction, as will be more fully described and particularly pointed out in the appended claims.

In the accompanying drawings:

Fig. 1 is a longitudinal sectional view showing the actuating unit and actuated unit and fragmentally showing these units connected together;

2

Fig. 2 is a similar section showing upon a larger scale a different position of the actuating unit;

Fig. 3 is an elevation of the actuating screw or threaded shaft;

Fig. 4 is a section on line 4—4 of Fig. 2;

Fig. 5 is a section on line 5—5 of Fig. 2;

Fig. 6 is a perspective view of the collar in which the valve is mounted;

Fig. 7 is a sectional view showing this collar and valve assembly with the removable valve seat which is mounted in the piston.

In proceeding with this invention we have provided two units having a conduit connecting them. Each unit contains a chamber communicating with the conduit connecting the units and pistons provided in the chambers, so that when one piston is moved to diminish the volume of liquid in the chamber the liquid is forced into the chamber in the other unit and forces the piston therein in a direction so that this unit increases its amount of fluid as the piston moves to provide for it. The piston in the actuating unit is moved by a shaft having screw threads thereon while a threaded shaft in engagement with the piston in the actuated unit is rotated in response to axial movement of the piston in this actuated unit.

With reference to the drawings 10 designates the actuating unit and 11 the actuated unit while 12 designates a conduit which may be of any desired length or shape which will transmit liquid from one unit to the other and which acts as the sole means of connecting the units together. The actuating unit 10 comprises a body 14 of generally cylindrical shape which has a cylindrical bore 15 extending inwardly from one end in which a piston 16 is slidably mounted. The bore of the body is reduced in diameter as at 17 so as to provide an abutment shoulder 18 between the bores 15 and 17 while the bore formed from the opposite end is of one size at 19 substantially the same size as bore 15 and larger as at 20.

The piston 16 in the bore 15 has packing or piston rings 21 to prevent the passage of fluid along its surface which contacts with the bore 15. This piston is reduced as at 22 to slide in the bore 17 while this extending tubular portion 22 is internally threaded as at 23 to engage the thread of the shaft 24 which is rotatably mounted by means of a ball bearing 25 in the body 14, which fits snugly in the bore 29 of this body portion. A bearing 26 is also located in the bore 20 of the body and serves as a sliding mounting for the nut 27 which has threaded engagement with the threads of the shaft 24. This bearing 26 is locked in place by a pin 28. A closure cap 29 for the end of the body is secured in place by mounting bolts 30 to close one end of the bore of the unit 10. This cap contains in a suitable recess therein a sealing unit 31 to prevent the escape of fluid which is contained in the unit. An operating handle 32 is secured in place by nut 32' on the end of the shaft 24. Spring 33 is under compression and acts between the nut 27 and a washer 34 which abuts against the end of piston collar 22 and tends to force these two threaded parts against which it presses in opposite directions thus providing a balanced action on the shaft.

An end wall 35 is secured to the body by bolts 36 to close the bore 15. This end wall is provided with an opening 37 to which the conduit 12 is detachably connected. Liquid is located in the chamber 38 to be forced by the piston 16 through the conduit 12.

A cylindrical shell 40 surrounds the body 14 and telescopes the portion 41 at one end and the portion 42 at the other end of the body which are larger than the intermediate portions of the body so as to provide an annular chamber 43 in the space about the body 14. The body is provided with an axially extending conduit 44 which communicates with chamber 43 and the radially extending conduit 45 located in the flanged portion 46 of the body and to some convenient reservoir of supply which will provide such a head as to cause liquid to flow into and maintain the chamber 43 full of liquid.

The piston 16 has a central internally threaded bore 48 into which a unit designated generally 49 and shown in Fig. 7 is threaded. This unit comprises a cylindrical portion 50 having a flange 51 and an end wall 52 which is provided with a valve seat 53 in which there is located a valve 54 having a tapered sealing surface 55 to engage with the seat and enclose the same. On the end of this valve an abutment and guide collar 56 is secured by means of a pin extending through opening 57 in the collar and through the end of the valve while a spring 59 abuts the collar 56 and forces the valve to its seat. The collar 56 slidably fits the portion 50 and extends a substantial distance rearwardly of the unit 49 so that when the piston is moved to completely retracted position this collar 56 will engage the end of the shaft 24 and force the valve from its seat to the dotted line position shown in Fig. 7, the valve being shown in closed position and as spaced from the shaft 24 in Fig. 2. Grooves 58 are provided in the collar 56 to provide communication with the interior of unit 49 so that liquid in the chamber 43 may pass through the radial conduit 60 in the body and 60' in the piston to provide a communication between the supply reservoir 43 and its reservoir or chamber 38 when the piston is in retracted position. Thus, should there be any leakage in the system the reservoir would supply that liquid which may have escaped at each retraction of the piston.

The actuated unit designated generally 11 is generally similar to the actuating unit 10. It comprises a body 65 having a cylindrical bore 66 extending from one end which is reduced as at 67 and then again enlarged as at 68 and further enlarged at 69. The piston 70 slides in the bore 66 with its packing or piston rings 71 to prevent passage of liquid along between the bore and the piston. On one side of the piston is a chamber 72 which communicates with a conduit 12. The piston is tubular having a cavity 73 which is closed by a plug 74 instead of a valve as shown in connection with the other actuating unit. The reduced portion of this piston 75 is internally threaded as at 76 so as to have a threaded engagement with the shaft 77 which carries thread 78, while this portion is keyed as at 79 to slide along the bore 67 in the body 65. Shaft 77 is rotatably mounted in the body by means of the ball bearing unit 80 while leakage is prevented by a sealing means 81 which is housed in the closure cap 82 for the end of the body 65 which is held in place by the mounting bolts 83. A lever 84 is fixed to the shaft 77 so that as this shaft rotates this lever will swing to do such work as is required of it. A spring 86 acts against an abutment washer 85 and also against an abutment washer 87 which engages one end of the piston so as to urge the piston axially in a direction to decrease the volume of liquid in the chamber 72. The pitch of the plural threads is such that an axial thrust of the piston will cause rotation of the shaft. An end wall 88 is secured by bolts 88' to close one end of the body 65 and is provided with an opening 89 for threadingly connecting conduit 12 to the unit.

A shell 90 is positioned about the body 65 and provides an annular chamber 91 which may contain fluid of a lubricating nature and which may connect through conduit 92 with the space 93 in which the spring 86 is located. By reason of this arrangement an expansion chamber is formed for any liquid which may be utilized to lubricate the shaft upon retraction of the piston from the position shown in Fig. 1.

The spring 86 will at all times even when under compression exert less force upon piston 75 than will the spring 33 exert upon piston 16. Accordingly the lever 84 will remain in position after it has been actuated to a certain predetermined point. The pitch of the screws or threads on shafts 77 and 24 will be the same so that a corresponding movement of these shafts will be caused. Spring 33 although acting in one direction on the piston tending to move the shaft 24 is compensated for by the same action of this spring upon nut 27 in the opposite direction, which nut also serves to maintain the spring at constant strength and therefore at uniform pressure. Thus, any thrust which is caused by this spring tending to move the shaft 24 in one direction is neutralized by a thrust in the opposite direction of nut 27 tending to turn the shaft in the opposite direction and therefore by this arrangement the shaft is in balanced relation and there is no tendency to rotate the shaft in either direction from the spring 33. Further, any pressure of the liquid on piston 16 because of this spring 33 will not rotate the shaft 24.

In operation, assuming the chamber 38 and chamber 72 and the conduit connecting them are full of liquid and the lever 32 has been moved sufficiently so that the valve 54 is closed, at which point the handle 32 and the lever 84 are both located in the same angular position of rotation relative to the axis of the shafts 24 and 77, then any further movement of the lever 32 which will force the piston 16 to decrease the size of the chamber 38 will cause the fluid to pass through the conduit 12 and correspondingly increase the size of the chamber 72 which is of the same diameter by causing the piston 70 to be axially moved therein which in turn will cause a rotation of the shaft 77 and correspondingly move lever 84 to cause it to angularly move handle 32 at some point remote from the location of the unit 10. The length of the chamber 38 and 72 may be such as to cause one or more complete revolutions of the lever 84. If, however, it is desired to retard or move the lever 84 in the opposite direction it is merely necessary to move the hand lever 32 in such opposite direction which will withdraw the piston 16 in the unit 10 and spring 86 will be of such strength as to force the piston 70 to move the fluid out of the chamber 72 back into the chamber 38 through conduit 12 and will correspondingly turn the shaft 77 to retard the lever 84. After complete retraction of the lever 84 through movement of the piston 72 to the end of its stroke a further movement of the piston 16 by means of the handle 32 is permitted so that the valve 54 may be opened and any liquid which may have escaped from the system will be replenished automatically by reason of a sufficient head on the supply liquid which will force it into the actuating part of the system. A drain may be provided at plug 95 if desired for the escape of any liquid into the chamber 91.

We claim:

1. In a remote control apparatus an actuating unit comprising a casing, a piston movable in said casing, a rotatable shaft, and threaded means between said shaft and piston to cause axial movement of the piston upon rotary movement of the shaft, a nut on said shaft also axially movable upon rotation of said shaft, and a spring under compression abutting said nut and piston to exert pressure in opposite directions thereon, an actuated unit comprising a casing, a conduit connecting the casing of said units, a piston in the last said casing, a spring urging said piston in a direction to reduce the volume of liquid in the actuated unit, a shaft in said casing, threaded means between said shaft and piston of a pitch to cause rotation of the shaft upon axial movement of the piston, actuating fluid in the casings of each unit and in said conduit whereby movement of one piston will be transferred to the other piston through said liquid and thence to said shaft of the actuated unit, the spring of the actuated unit exerting a pressure less than the spring in the actuating unit.

2. In a remote control apparatus an actuating unit comprising a casing containing actuating liquid, a piston movable in said casing for controlling said liquid, a rotatable shaft, and threaded means between said shaft and piston to cause axial movement of the piston upon rotary movement of the shaft, an abutment movable along said threaded means, resilient means engaging said abutment and said piston for exerting opposite equal forces on said threads tending to rotate said shaft in opposite directions, an actuated unit comprising a casing, a conduit connecting the casing of said units, a piston in the last said casing, a shaft in said casing, a spring surrounding said shaft urging said piston in a direction to reduce the volume of liquid in the actuated unit, threaded means between said shaft and piston of a pitch to cause rotation of the shaft upon axial movement of the piston, actuating fluid in the casings of each unit and in said conduit whereby movement of one piston will be transferred to the other piston through said liquid and thence to said shaft of the actuated unit, said resilient means preventing movement of the piston along the shaft in the actuating unit when under pressure of said fluid.

3. In a remote control apparatus, an actuating unit comprising a casing containing actuating liquid, a piston movable in said casing for controlling said liquid, a rotatable shaft, and threaded means between said shaft and piston to cause axial movement of the piston upon rotary movement of the shaft, an actuated unit comprising a casing, a conduit connecting the casing of said units, a piston in the last said casing, a spring urging said piston in a direction to reduce the volume of liquid in the actuated unit, a shaft in said casing, threaded means between said shaft and piston of a pitch to cause rotation of the shaft upon axial movement of the piston, actuating fluid in the casings of each unit and in said conduit whereby movement of one piston will be transferred to the other piston through said liquid and thence to said shaft of the actuated unit, and means acting against one end of the piston in the actuating unit for preventing movement of the piston along the shaft when the opposite end of said piston is under pressure of said fluid.

4. In a remote control apapratus, an actuating unit comprising a casing containing actuating liquid, a piston movable in said casing for controlling said liquid, a rotatable shaft, and threaded means between said shaft and piston to cause axial movement of the piston upon rotary movement of the shaft, an actuated unit comprising a casing, a conduit connecting the casings of said units, a piston in the last said casing, a shaft in said casing, a spring surrounding said shaft urging said piston in a direction to reduce the volume of liquid in the actuated unit, threaded means between said shaft and piston of a pitch to cause rotation of the shaft upon axial movement of the piston, actuating fluid in the casings of each unit and in said conduit whereby movement of one piston will be transferred to the other piston through said liquid and thence to said shaft of the actuated unit, and means acting against one end of the piston in the actuating unit for preventing movement of the piston along the shaft when the opposite end of said piston is under pressure of said fluid.

ROBERT STEVENSON.
ALEXANDER W. KEEMA.

REFERENCES CITED

The following references are of record in the file of this patent:

UNITED STATES PATENTS

| Number | Name | Date |
| --- | --- | --- |
| 1,828,965 | Fuller | Oct. 27, 1931 |
| 1,932,916 | Taylor | Oct. 31, 1933 |
| 2,192,175 | Ballard | Mar. 5, 1940 |
| 2,204,649 | Barnhart | June 18, 1940 |
| 2,264,675 | Nardone | Dec. 2, 1941 |
| 2,305,302 | Mazur | Dec. 15, 1942 |